Feb. 2, 1971   D. J. LIPSCOMB   3,559,420

DELAYED RESTARTING CIRCUIT FOR COMPRESSOR MOTOR

Filed March 5, 1969

INVENTOR
DENNIS J. LIPSCOMB

BY

*Barnes, Kisselle, Raisch & Choate*

ATTORNEYS

United States Patent Office 3,559,420
Patented Feb. 2, 1971

3,559,420
DELAYED RESTARTING CIRCUIT FOR COMPRESSOR MOTOR
Dennis J. Lipscomb, La Grange, Ind., assignor to Motor Wheel Corporation, Lansing, Mich., a corporation of Ohio
Filed Mar. 5, 1969, Ser. No. 804,514
Int. Cl. F25b 1/00
U.S. Cl. 62—158                                                5 Claims

ABSTRACT OF THE DISCLOSURE

A thermal relay circuit providing delayed restarting of a compressor motor in a refrigeration system each time the power to the motor is interrupted by either a line fault, a thermostat or a manual shut-off switch. The thermal relay is connected in the circuit so that its contacts energize a main relay whose contacts, in turn, energize the motor. The heater of the thermal relay is connected directly across the contacts of the main relay so that when the main relay contacts operate they simultaneously energize the motor and short the resistance heater to de-energize the thermal relay.

---

This invention relates to delayed restarting of a compressor motor in an air conditioner of the type that is used in mobile homes, trailers, campers, boats, and the like where operation from an auxiliary power supply such as a motor-generator is contemplated. The present invention is an improvement over the delayed restarting circuit disclosed in U.S. Pat. 3,422,633 granted Jan. 21, 1969, to Peter C. Bodett and assigned to the assignor of the present invention.

As explained in greater detail in the aforementioned Bodett patent, when the compressor motor in an air conditioner is stopped, as for example thermostatically or upon a line fault, a substantial load is presented to the compressor motor on restarting unless the pressure of the refrigerant in the refrigeration system has sufficient time to equalize. There is a particular problem with air conditioners operated by auxiliary power supplies and hence it is desirable to assure pressure equalization under all restarting conditions so that starting surge current can be reduced to protect the auxiliary power supply against overload.

The objects of the present invention are to provide an improved delayed restarting circuit for a compressor motor that is an improvement over the delayed restarting circuit disclosed in the aforementioned Bodett Pat. 3,422,633; that performs substantially the same function as the Bodett circuit but with fewer parts and hence can be produced at a lower cost; and/or that operates effectively to provide delayed restarting of a compressor motor after the motor is stopped due to a power supply fault or normal thermostat operation.

Figure 2:
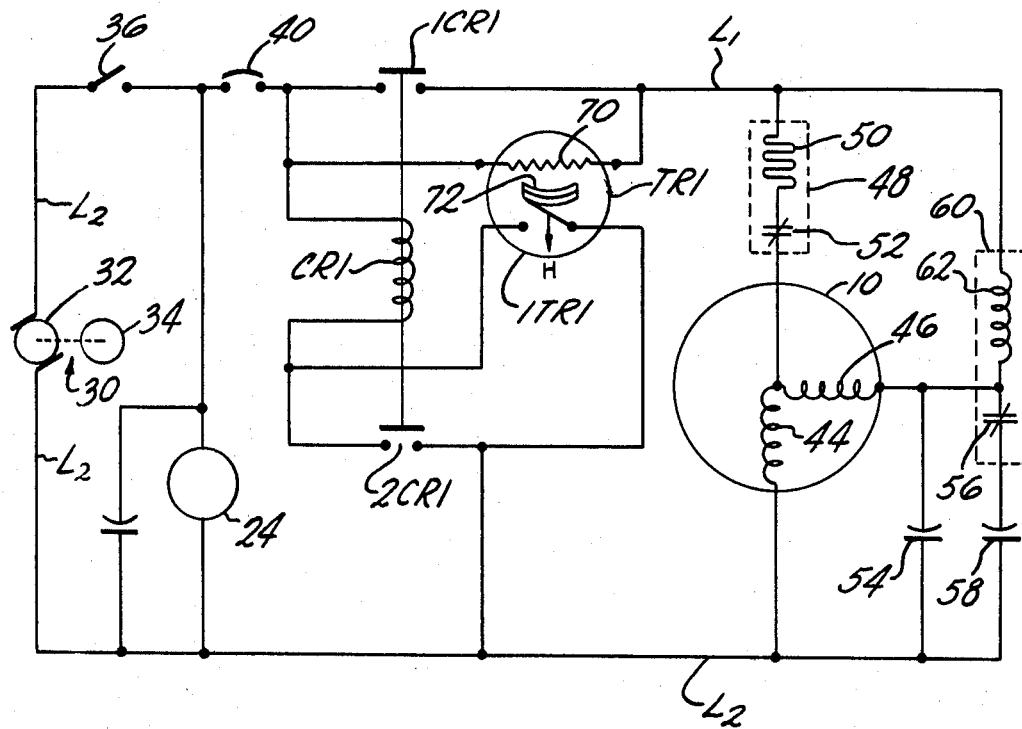
Figure 1:
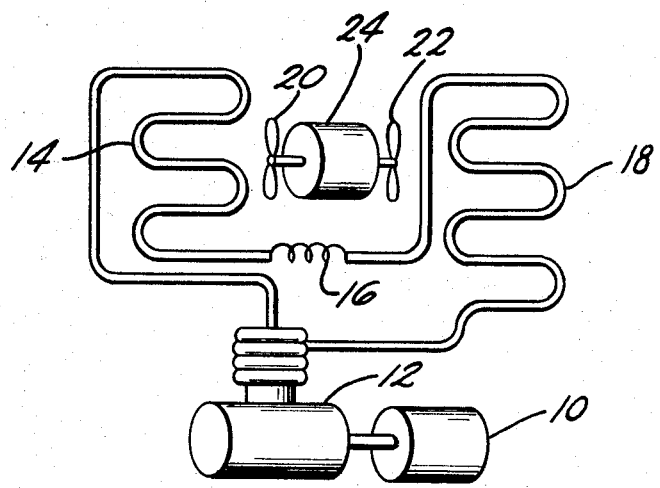

Other objects, features and advantages of the present invention will become apparent in connection with the following description, the appended claims and the accompanying drawings in which:

FIG. 1 is a schematic illustration of an air conditioning system with which the delayed restarting circuit of the present invention can be used; and FIG. 2 is a circuit diagram of the delayed restarting circuit.

The preferred application of the delayed restarting control of the present invention is with an air conditioner illustrated schematically in FIG. 1. The air conditioner includes the usual compressor motor 10, compressor 12, condenser 14, capillary tube 16 and evaporator 18 connected together in a conventional closed refrigeration system. The usual fans 20, 22 are driven by a fan motor 24 to circulate air over condenser 14 and evaporator 18. The air conditioner shown in FIG. 1 is for purposes of illustration only, it being understood that the details of the air conditioner are not a part of the present invention and that various modifications are contemplated.

The circuit of FIG. 2 for controlling motor 10 includes an auxiliary alternating current source 30 illustrated as a generator 32 driven by a motor 34. In the preferred application, the control circuit of the present invention is used with air conditioners that are powered by auxiliary power supplies such as the motor-generator arrangement as contrasted to steady sources of power from utility lines. The output of generator 32 is connected to a pair of main lines $L_1$ and $L_2$. Line $L_1$ is connected to motor 10 through a manually operated on-off switch 36, thermal actuated switch contacts 40 and normally opened relay contacts 1CR1 of a relay coil CR1. Contacts 40 are part of the thermostat of the air conditioner of FIG. 1.

The compressor motor 10 is a split-phase induction motor (capacitor-start, capacitor-run) having a run winding 44 and a start winding 46. The run winding 44 is connected across lines $L_1$ and $L_2$ through an overload protection circuit 48 consisting of a resistance heater 50 connected in series with normally closed bimetal switch contacts 52. Contacts 52 are operated by heater 50 in response to excessive current through windings 44, 46. Preferably, contacts 52 also respond directly to the temperature of compressor 12. The start winding 46 is connected across the run winding 44 through a run capacitor 54 to the main line $L_2$. A start capacitor 58 is connected in parallel with the run capacitor 54 through normally closed relay contacts 56 of a motor starting circuit 60. Contacts 56 are operated by a voltage responsive relay coil 62 connected between contacts 56 and line $L_1$. The fan motor 24 is connected to line $L_2$ between switch 36 and thermostat contacts 40 and directly across lines $L_1$, $L_2$ so as to be controlled only by switch 36.

The delayed restarting control of the present invention comprises a thermal relay TR1 having a resistance heater 70, a bimetal switch element 72 and normally opened contacts 1TR1. Heater 70 is connected to line $L_1$ directly across contacts 1CR1 so that closure of contacts 1CR1 shorts the heater 70. Heating of the bimetal switch element 72 in response to current flow through heater 70 closes contacts 1TR1 after a predetermined time delay. The relay coil CR1 is connected in series with the thermal relay contacts 1TR1 across lines $L_1$, $L_2$. The connection of coil CR1 to line $L_1$ is between the thermostat contacts 40 and the contacts 1CR1. Relay CR1 also has a normally opened contact 2CR1 connected directly across the thermal relay contacts 1TR1 and in series with the relay coil CR1 across lines $L_1$, $L_2$ to thereby maintain coil SR1 energized after contacts 1TR1 close and then reopen.

In the operation of the air conditioner and the motor controls described hereinabove, switch 36 is closed to initiate operation of the control and turn on the fan motor 24. If the temperature of the environment requires cooling, the thermostat contacts 40 close to connect heater 70 to source 30. When heater 70 is energized, the bimetal switch element 72 is heated and, after a predetermined time delay, element 72 warps to close contacts 1TR1 and thereby energize coil CR1. When relay CR1 is energized, contacts 1CR1 and 2CR1 close simultaneously. Closure of contacts 1CR1 connects windings 44, 46 of motor 10 directly to source 30 to start the motor in a conventional manner. Contacts 1CR1 also short the thermal relay heater 70 to thereby deenergize thermal relay TR1 and open contacts 1TR1. Contacts 2CR1 maintain relay CR1 energized.

As the speed of the motor picks up, the relay coil 62 opens contacts 56 in response to a predetermined voltage to take capacitor 58 out of the circuit in a conventional manner. As long as motor 10 is not overloaded, the contacts 52 in the overload protection circuit 48 remain closed. However, the bimetal contacts 52 will open in response to excessive current through heater 50 or in response to excessive temperature of compressor 12. The bimetal switch contacts 52 have a long reset time to assure that the windings 44, 46 and the compressor have cooled to a low temperature where the compressor can restart effectively.

During normal operation, when the environment being cooled reaches the desired temperature and the thermostat opens contacts 40 to stop motor 10, relay CR1 is deenergized to open contacts 1CR1 and 2CR1. Opening of contacts 1CR1 disconnects motor 10 from source 30 and opening of contacts 2CR2 readies the thermal relay 1TR1 for the next restarting operation. With contacts 2CR1 open, the compressor motor 10 can restart only after a delayed restarting sequence introduced by thermal relay TR1. The time delay of thermal relay TR1 is chosen to assure sufficient equalization in the refrigeration system for effective restarting. It will be apparent that whenever motor 10 is stopped due to a power supply fault, motor 10 likewise cannot be restarted without cycling through the time delay control in the manner described hereinabove in connection with initial starting by operating switch 36.

The restarting delay introduced by the thermal relay TR1 need only be long enough to assure that refrigerant pressure in the system shown in FIG. 1 has equalized through capillary tube 16 sufficiently to present a low starting load for the motor 10. During normal operation, when the compressor 12 stops, the refrigerant pressure equalizes through capillary tube 16 in a relatively short time. However, the delayed restarting by relay TR1 operates completely independently of the overload protection circuit 48 and independently of the time delay in reclosing contacts 52 if the overload protection circuit 48 trips. Hence the delay introduced by relay TR1 can be short relative to the delay provided by the overload protection circuit 48. Stated differently, the time delay introduced by relay TR1 modifies the operation of contacts 40 and switch 36, but it does not modify restarting by the overload protection circuit 48. With 6,000 and 10,000 B.t.u. air conditioners for which the present invention was conceived, pressure equalizes in about 90 seconds and the thermal relay provides a time delay of about 120 seconds. By comparison, the overload protection circuit 48 delays restarting for a substantially longer period, say 15 minutes to one hour depending upon the ambient temperature. Additionally, the delayed restarting circuit does not affect the operation of the fan motor 24. This arrangement assures that the source 30 will never be overloaded by starting or restarting both motors 10 and 24 simultaneously.

The delayed restarting circuit described hereinabove provides a significant cost advantage over that disclosed in the aforementioned Bodett patent. The present delayed restarting circuit is extremely simple and can be incorporated economically into the motor controls for commercially available motor-compressor units for air conditioners. Since the bimetal switch element 72 is electrically isolated from heater 70 and does not carry the motor current, the relay is a relatively inexpensive low-current device. It should be noted that with contacts 1CR1 open, the resistance heater 70 is in series with the motor 10 and hence the heater 70 will carry some leakage current after switch 36 and contacts 40 close but before the motor 10 is restarted. However, the heater resistance may be relatively large, for example, in excess of 100 ohms so that the leakage current through the resistance heater 70 before the motor starts is only approximately one amp. By comparison, the starting current for the motor is about 40 amps. Hermetically sealed units containing motor 10, compressor 12 and the overload protection circuit 48 are commercially available. The capacitor starting circuit 60 and the delayed restarting circuit of the present invention can be added economically by the air conditioner manufacturer.

It is to be understood that the delayed restarting circuit of the present invention has been described hereinabove for purposes of illustration and is not intended to indicate limits of the present invention, the scope of which is defined by the following claims.

What is claimed is:

1. A control circuit for a compressor motor in a refrigeration system to selectively operate said motor from an alternating current source comprising switch means, a first circuit connection including said switch means adapted to connect said motor across said source, and control circuit means operatively connected in said first circuit connection and responsive to actuation of said switch means to delay starting of said motor for a predetermined time and then automatically complete said first circuit connection to thereby allow at least partial pressure equalization in said system before said compressor motor is started, said control circuit means comprising relay means having first contact means operatively connected in said first circuit connection for completing said connection between said motor and said source, and a thermal relay having resistance heater means and second contact means, said heater means being connected in said first circuit means to be energized in response to actuation of said switch means and being operatively associated with said second contact means to operate said second contact means upon actuation of said switch means after said predetermined time has lapsed, said second contact means being operatively connected in circuit with said relay means to operate said relay in response to energization of said heater means, and wherein said first contact means is connected in shunt with said resistance heater means to thereby substantially simultaneously deenergize said heater means and complete said connection to said motor upon actuation of said relay means, and wherein said control circuit has a pair of output terminals for connection to said motor, a pair of input terminals for connection to said source, a first electrical line connecting one of said input terminals to one of said output terminals and a second electrical line connecting the other input terminal to the other output terminal, said switch means and said first contact means are interposed in one of said electrical lines to thereby make or break said first connection, said relay means comprises a coil having one terminal thereof connected to said one line at a point electrically between said switch means and said first contact means, said resistance heater means has first and second terminals, said first terminal is connected in said one line at said point electrically between said switch means and said first contact means and said second terminal is connected in said one line at a point electrically between said first contact means and one of said output terminals, and wherein said second contact means of said thermal relay is connected between the other terminal of said relay coil and said other line in series with said coil.

2. The control circuit set forth in claim 1 wherein said relay means further comprises third contact means operable substantially in synchronism with said first contact means and wherein said third contact means is operatively connected across said second contact means of said thermal relay.

3. A control circuit for a compressor motor in a refrigeration system to selectively operate said motor from a source of alternating current to delay starting of said motor for a predetermined time and then automatically connect said motor to said source to thereby allow at least a partial pressure equalization in said system before said compressor motor is started, comprising a pair of input terminals for connection to said source, a pair of output terminals for connection to said motor, a first electrical line for connecting one of said input terminals to one of said output terminals, a second electrical line for connecting the other input terminal to the other output terminal, switch means having first contacts, thermostat means having second contacts, and relay means having third contacts, said first, second and third contacts being connected in said lines so that upon closure of said first, said second and said third contacts said control circuit is operative to transfer energy from said input terminals to said output terminals, said third contacts comprise a first terminal and a second terminal, said first terminal of said third contacts is connected to one of said output terminals via said lines, said second terminal of said third contacts is connected to one of the other contacts via said lines, a thermal relay having fourth contacts and resistance heater means to close said fourth contacts after a predetermined time in response to energization of said heater, said resistance heater means is connected across said first and second terminals of said third contacts, and said relay means comprises a coil connected in series circuit with said fourth contacts across said lines to operate said relay means in response to closure of said fourth contacts, said series circuit being connected to said second terminal of said third contacts, and wherein said relay means further comprises fifth contacts connected across said fourth contacts and in series with said relay coil so that in response to closure of said switch contacts and said thermostat contacts to energize said heater said fourth contacts close after said predetermined time to thereby energize said relay and close said third and said fifth contacts.

4. A control circuit for a compressor motor in a refrigeration system to selectively operate said motor from an alternating current source comprising switch means, a first circuit connection including said switch means adapted to connect said motor across said source, and control circuit means operatively connected in said first circuit connection and responsive to actuation of said switch means to delay starting of said motor for a predetermined time and then automatically complete said first circuit connection to thereby allow at least partial pressure equalization in said system before said compressor motor is started, said control circuit means comprising relay means having first contact means operatively connected in said first circuit connection for completing said connection between said motor and said source, and a thermal relay having resistance heater means and second contact means, said heater means being connected in said first circuit means to be energized in response to actuation of said switch means and being operatively associated with said second contact means to operate said second contact means upon actuation of said switch means after said predetermined time has lapsed, said second contact means being operatively connected in circuit with said relay means to operate said relay means in response to energization of said heater means, and wherein said first contact means is connected in shunt with said resistance heater means so as to provide a current bypass and thereby deenergize said heater means while substantially simultaneously completing said connection to said motor in response to actuation of said relay means.

5. The control circuit set forth in claim 4 wherein said first circuit connection comprises an electrical line connected between said motor and said source, said switch means and said first contact means are interposed in said electrical line to thereby make or break said first connection, and wherein said resistance heating means is connected directly across said first contact means so that said first contact means substantially short circuits said resistance heating means.

References Cited

UNITED STATES PATENTS

| 3,054,271 | 9/1962 | McGrath | 62—158 |
| 3,142,013 | 7/1964 | McGrath | 62—158 |
| 3,358,468 | 12/1967 | Shaw | 62—158 |
| 3,422,633 | 1/1969 | Bodett | 62—158 |

MEYER PERLIN, Primary Examiner

U.S. Cl. X.R.

318—472